United States Patent
Lubashev et al.

(10) Patent No.: US 11,483,176 B2
(45) Date of Patent: *Oct. 25, 2022

(54) TRAFFIC DELIVERY USING ANYCAST AND END USER-BASED MAPPING IN AN OVERLAY NETWORK

(71) Applicant: Akamai Technologies, Inc., Cambridge, MA (US)

(72) Inventors: Igor Lubashev, Arlington, MA (US); Elizabeth L. Borowsky, West Roxbury, MA (US); Stephen Hill, Bedford, MA (US); Katharine Jenkins, Reading, MA (US); Debabrata Banerjee, Somerville, MA (US); Noam Freedman, Cambridge, MA (US); Marcelo Torres, Arlington, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/067,918

(22) Filed: Oct. 12, 2020

(65) Prior Publication Data

US 2021/0028959 A1   Jan. 28, 2021

Related U.S. Application Data

(63) Continuation of application No. 15/081,848, filed on Mar. 26, 2016, now Pat. No. 10,805,110.
(Continued)

(51) Int. Cl.
*G06F 15/16* (2006.01)
*H04L 12/46* (2006.01)
(Continued)

(52) U.S. Cl.
CPC ...... *H04L 12/4633* (2013.01); *H04L 12/6418* (2013.01); *H04W 4/025* (2013.01)

(58) Field of Classification Search
CPC .............. H04L 12/4633; H04L 61/1511; H04L 61/6059; H04L 67/1002; H04L 67/1008;
(Continued)

(56) References Cited

U.S. PATENT DOCUMENTS 6,950,407 B1 * 9/2005 Huddle .................. H04L 12/14
370/254
8,848,508 B2 * 9/2014 Moreno .................. H04L 45/28
370/219

(Continued)

*Primary Examiner* — Dustin Nguyen
*Assistant Examiner* — Hao H Nguyen
(74) *Attorney, Agent, or Firm* — David H. Judson

(57) ABSTRACT

An overlay network is enhanced to provide traffic delivery using anycast and end user mapping. An anycast IP address is associated with sets of forwarding machines positioned in the overlay network. These locations correspond with IP addresses for zero rated billing traffic. In response to receipt at a forwarding machine of a packet, the machine issues an end user mapping request to the mapping mechanism. The mapping request has an IP address associated with the client from which the end user request originates. The mapping mechanism resolves the request and provides a response to the request. The response is an IP address associated with a set of server machines distinct from the forwarding machine. The forwarding machine encapsulates the packet and proxies the connection to the identified server. The server receives the connection, decapsulates the request, and processes the packet. The server machine responds to the requesting client directly.

9 Claims, 5 Drawing Sheets

Related U.S. Application Data

(60) Provisional application No. 62/139,364, filed on Mar. 27, 2015.

(51) Int. Cl.
*H04W 4/02* (2018.01)
*H04L 12/64* (2006.01)

(58) Field of Classification Search
CPC . H04L 69/16; H04L 12/1435; H04L 12/1496; H04L 29/12066; H04L 45/306; H04L 45/64; H04L 49/70; H04L 61/2007; H04L 67/02; H04L 67/1029; H04L 67/2814; H04L 67/2842; H04W 4/025
See application file for complete search history.

(56) References Cited

U.S. PATENT DOCUMENTS

| | | | | |
|---|---|---|---|---|
| 2010/0057894 A1* | 3/2010 | Glasser | ............... | H04L 61/4511 709/222 |
| 2011/0040861 A1* | 2/2011 | Van der Merwe | ........................... | H04L 61/4511 709/245 |
| 2011/0055316 A1* | 3/2011 | Van der Merwe | ...... | H04L 45/16 709/245 |
| 2011/0153864 A1* | 6/2011 | Prasad | ................ | H04L 61/2007 709/242 |
| 2011/0231475 A1* | 9/2011 | Van der Merwe | ........................... | H04L 67/1002 709/203 |
| 2012/0209990 A1* | 8/2012 | Honore | ............... | H04L 12/1496 709/224 |
| 2013/0132498 A1* | 5/2013 | Wainner | ............... | H04L 67/1021 709/208 |
| 2013/0318219 A1* | 11/2013 | Kancherla | ........... | H04L 41/0806 709/222 |
| 2013/0318233 A1* | 11/2013 | Biswas | ................. | H04W 8/005 709/224 |
| 2014/0108694 A1* | 4/2014 | Chung | .................... | G06F 1/206 710/303 |
| 2015/0026251 A1* | 1/2015 | Van der Merwe | ........................... | H04L 61/4511 709/203 |
| 2015/0067066 A1* | 3/2015 | Radhakrishnan | ....... | H04L 51/08 709/206 |
| 2015/0373135 A1* | 12/2015 | McKeown | .......... | H04L 67/2876 709/202 |
| 2016/0142553 A1* | 5/2016 | Gandhi | ................... | H04L 67/01 455/406 |
| 2016/0191651 A1* | 6/2016 | Balakrishnan | ...... | H04L 67/5682 709/219 |
| 2016/0191664 A1* | 6/2016 | Balakrishnan | ........ | H04L 67/306 709/203 |
| 2019/0014078 A1* | 1/2019 | Ranta | ................. | G06Q 30/0241 |

\* cited by examiner

TRAFFIC DELIVERY USING ANYCAST AND END USER-BASED MAPPING IN AN OVERLAY NETWORK

BACKGROUND

Technical Field

This application relates generally to overlay networking and, in particular, to techniques to deliver traffic from fixed IP address in a scalable manner.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Content providers strike up business relationships with carriers such that end-users' data allowance is not deducted when accessing the content provider's content. For instance, a recent real-world example had Facebook announcing an arrangement whereby T-Mobile end-users could access Facebook content "for free" on the T-Mobile network. This practice is known as "Zero-Rating" or "Zero-Rated Billing" (or "0RB"), presumably because the data is rated as 0 bytes on the end-users' bill.

The business arrangements behind such deals are opaque to the content delivery network service provider. That said, CDN customers desire that the CDN support the approach. In particular, and once the 0RB arrangement is established and made known to the CDN, content providers provide the carrier with a list of IPs from which the content will be served. These IP addresses are then added to an access control list (ACL) or the like in the carrier's billing system. Traffic going to or from these IP addresses is then "Zero Rated."

While techniques for supporting 0RB traffic delivery are known, there remains a need in the art to provide enhanced techniques for scalable delivery by a CDN of this and other traffic types.

BRIEF SUMMARY

An overlay network is enhanced to provide traffic delivery using a combination of anycast and end user mapping (EUM). The overlay network comprises sets (or "regions") of server machines, and a mapping mechanism (typically DNS-based), which is normally operative to map an end user request to one of the server machines based in part on a location of a recursive name server behind which the end user request originates.

According to the approach of this disclosure, an anycast IP address is associated with one or more sets of "forwarding" machines positioned in the overlay network. These locations may correspond with IP addresses assigned for zero rated billing (0RB) traffic. In response to receipt at a forwarding machine of a packet associated with an end user request, the forwarding machine issues an end user mapping request to the mapping mechanism. The end user mapping request has associated therewith an IP address associated with the client from which the end user request originates. The IP address associated with the client is other than the IP address of the recursive name server behind which the end user request originates. One way to obtain the client IP address uses an EDNS0 client CIDR extension. The mapping mechanism resolves the EUM request and provides a response. The response includes an IP address associated with a set of one or more of the server machines. This IP address is determined by the mapping mechanism based at least in part on the IP address associated with the client, server machine liveness and load, and Internet traffic conditions. The IP address of the set of one or more of the server machines is associated with a deployment of server machines distinct from a location of the forwarding machine. The forwarding machine then encapsulates the packet and proxies the connection to the identified server machine IP address. The server machine receives the connection, de-encapsulates the request, and processes the packet, preferably applying conventional edge server processing. The server machine then responds to the requesting client directly, preferably via direct server return (DSR).

Thus, according to an embodiment of this approach, a CDN customer is assigned an anycast IP address for traffic, which automatically routes requests to one or many "nearest" CDN entrance locations. End user packets enter the CDN system via these anycast addresses, but are then forwarded inside the CDN system to different servers preferably based on the CDN's own routing, and those different servers are likely located in different geographic locations (from the anycast IPs). Preferably, the forwarding decision is based on the end user's actual location (as opposed to the location of the client's recursive DNS resolver), as well as the state of the CDN servers, and the state of the connectivity among locations on the Internet. The servers that receive the forwarded traffic preferably then reply directly to the end user (and not to the forwarding servers that received the incoming connections via anycast). This is sometimes referred to herein as triangular routing (or "direct server return") because the ingress traffic is handled by a small set of forwarding-only machines (at the anycast IP addresses), while the traffic is actually terminated by CDN edge machines that reply directly to the end users.

As noted above, a particular use case for this technique is where the ingress traffic is zero rated billing (0RB) traffic, although the technique may be used for other types of traffic whose delivery is supported by the overlay network.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
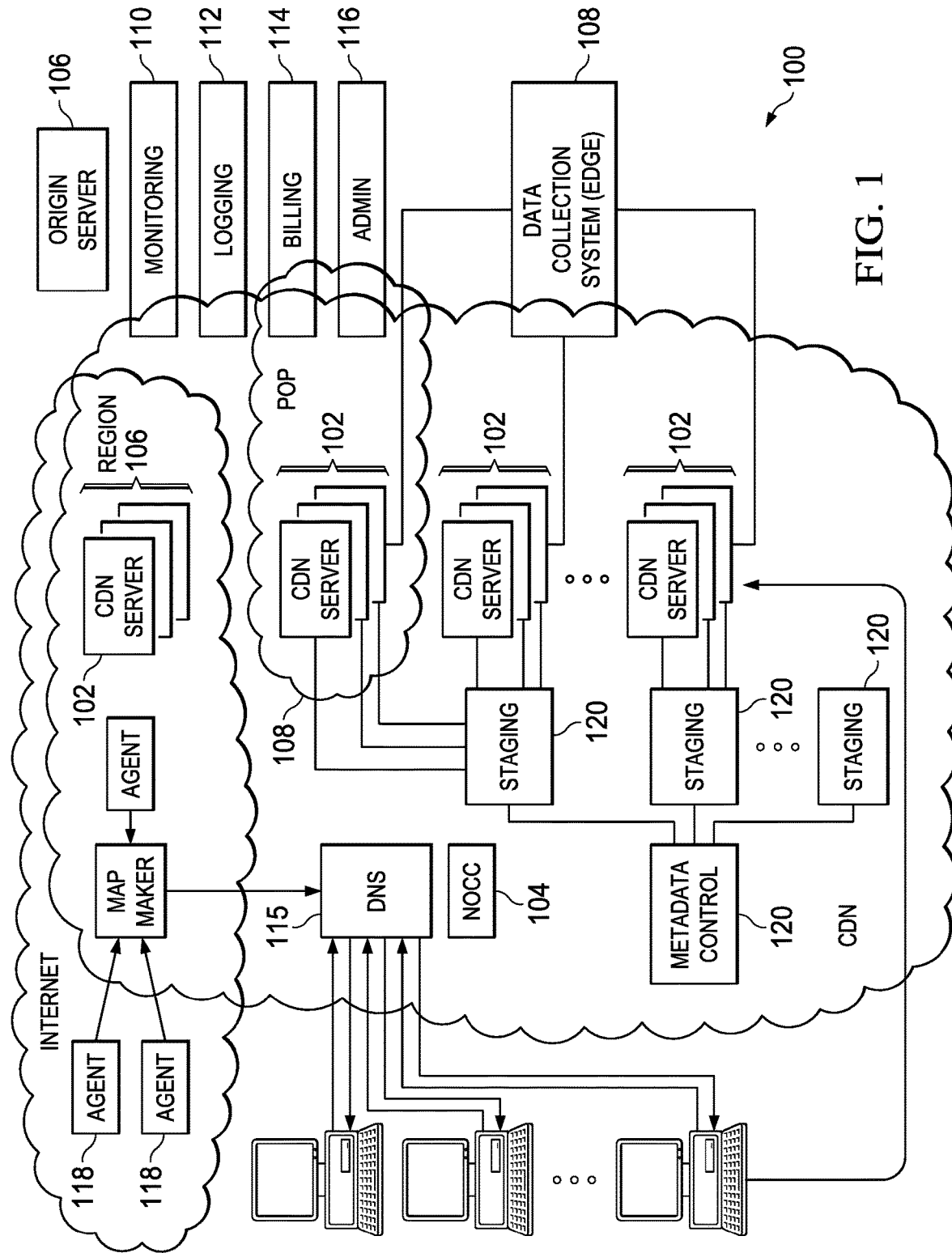
FIG. 1 is a block diagram illustrating a known distributed computer system configured as a content delivery network (CDN)

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
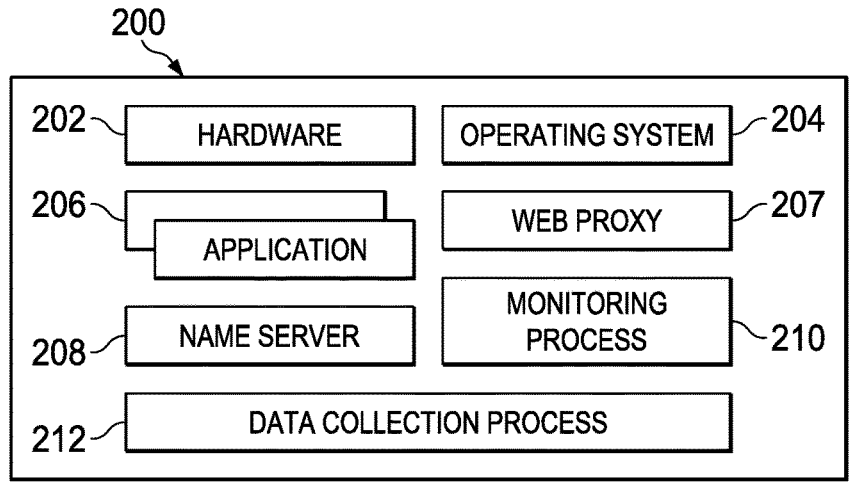
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide various technologies and techniques to accelerate traffic flow between an edge server, on the one hand, and a customer origin server, on the other. These technologies provide acceleration for many different types of interactions, e.g., delivery of dynamic content, edge server interactions with back-end origin infrastructures, and the like. Representative examples include, without limitation, the techniques described in U.S. Pat. No. 8,194,438 (overlay path selection optimization), and U.S. Pat. No. 8,477,837 (content pre-fetching). Other IP, TCP, UDP or application-layer optimizations may be implemented as well to facilitate such acceleration. These techniques are sometimes referred to herein as "overlay network optimizations."

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Anycast is the notion of using the same IP prefix advertised from multiple geographically-diverse locations. Typically, a /24 prefix is used to ensure acceptance of the anycast address. When anycast is used, traffic is routed (by default, using BGP) to the closest anycast region. To improve BGP routing quality and stability, it is known to setup multiple anycast prefixes (IPv4/24s and IPv6/40s) and assign these IPv4 and IPv6 prefixes to anycast clouds, e.g., associated with global transit ISPs. An anycast cloud may contain multiple anycast prefixes that preferably do not overlap with other cloud prefixes.

Edge IP Binding—Traffic Delivery Using Anycast and End User-Based Mapping

The following describes the technique of this disclosure with respect to the delivery of 0RB traffic. This is just a representative use case.

According to this disclosure, a CDN customer is assigned an anycast IP address (sometimes referred to as a anycast VIP) for traffic, which automatically routes requests to one or many "nearest" CDN entrance locations. End user packets enter the CDN system via these anycast addresses, but are then forwarded inside the CDN system to different servers preferably based on the CDN's own routing, and those different servers are likely located in different geographic locations (from the anycast IPs). Preferably, the forwarding decision is based on the end user's location, as well as the state of the CDN servers, and the state of the connectivity among locations on the Internet. The servers that receive the forwarded traffic preferably then reply directly to the end user (and not to the forwarding servers that received the incoming connections via anycast). Return traffic thus is from the anycast address, enabling zero rating by carriers. Preferably, the machines receiving the ingress traffic are located in anycast regions and operate high-performance IP forwarding software. These machines forward anycast traffic to edge network (or secure edge network) machines that service the requests and reply directly to end-users.

Figure 3:
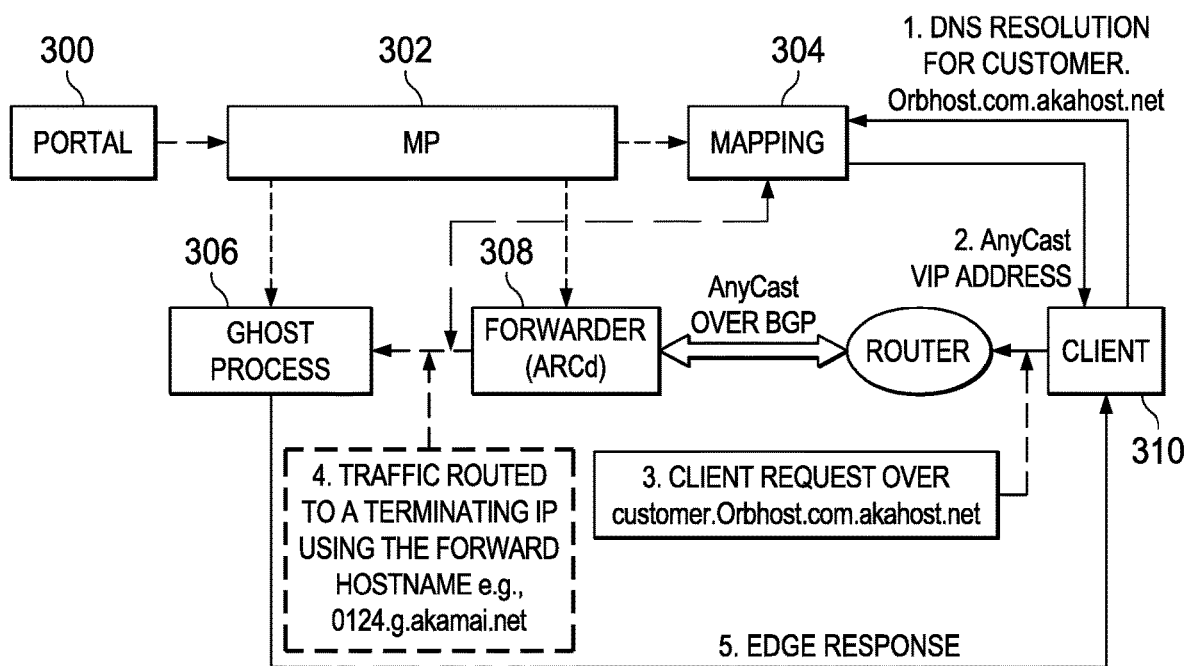
FIG. 3 illustrates the basic traffic delivery model of this disclosure using anycast and end user-based mapping in an overlay network.

The steps involved in the workflow are detailed below and illustrated with respect to FIG. 3. Initially, a customer configures an edge IP binding using the service provider portal 300. The portal publishes the configuration in the form of an index file, which is then received by a management platform 302 (such as data transport system 120 in FIG. 1). The management platform 302 delivers the index file to the main CDN DNS-based mapping system 304, as well as to the edge server 306, and the forwarders 308. Once this configuration is live, the Edge IP binding is active and the 0RB traffic can then be delivered from the fixed IP addresses (the 0RB addresses) in a scalable manner. In particular, and at step 1, a client's DNS resolver 310 makes a DNS query for a zero-rated billed (0RB) property. In this example scenario, a representative edge hostname for a digital property of this type has a "akahost.net" domain. Thus, in the workflow the request is made over "customer.0rbhost.com.akahost.net." At step 2, the DNS mapping system 304 then responds with one or more anycast VIP addresses. At step 3, the client request traffic is routed to a nearby "forwarder" region through anycast. As described above, the forwarders 308 are machines deployed in the anycast regions to serve as the ingest point for the traffic. The forwarder machines act as a front-end to the normal edge regions for all (or some defined subset of the) 0RB traffic, and they help in load balancing the incoming traffic on VIPs. At step 4, the request traffic from the forwarder 308 is forwarded to an edge ghost 306, preferably using an edge map. In the example, the edge map is a124.g.akamai.net. At step 5, the edge ghost 306 that receives the request then responds directly to the client. This is a direct server return.

In this 0RB scenario, preferably each customer gets the same VIP address in every edge region, and routing is done through anycast.

Figure 4:
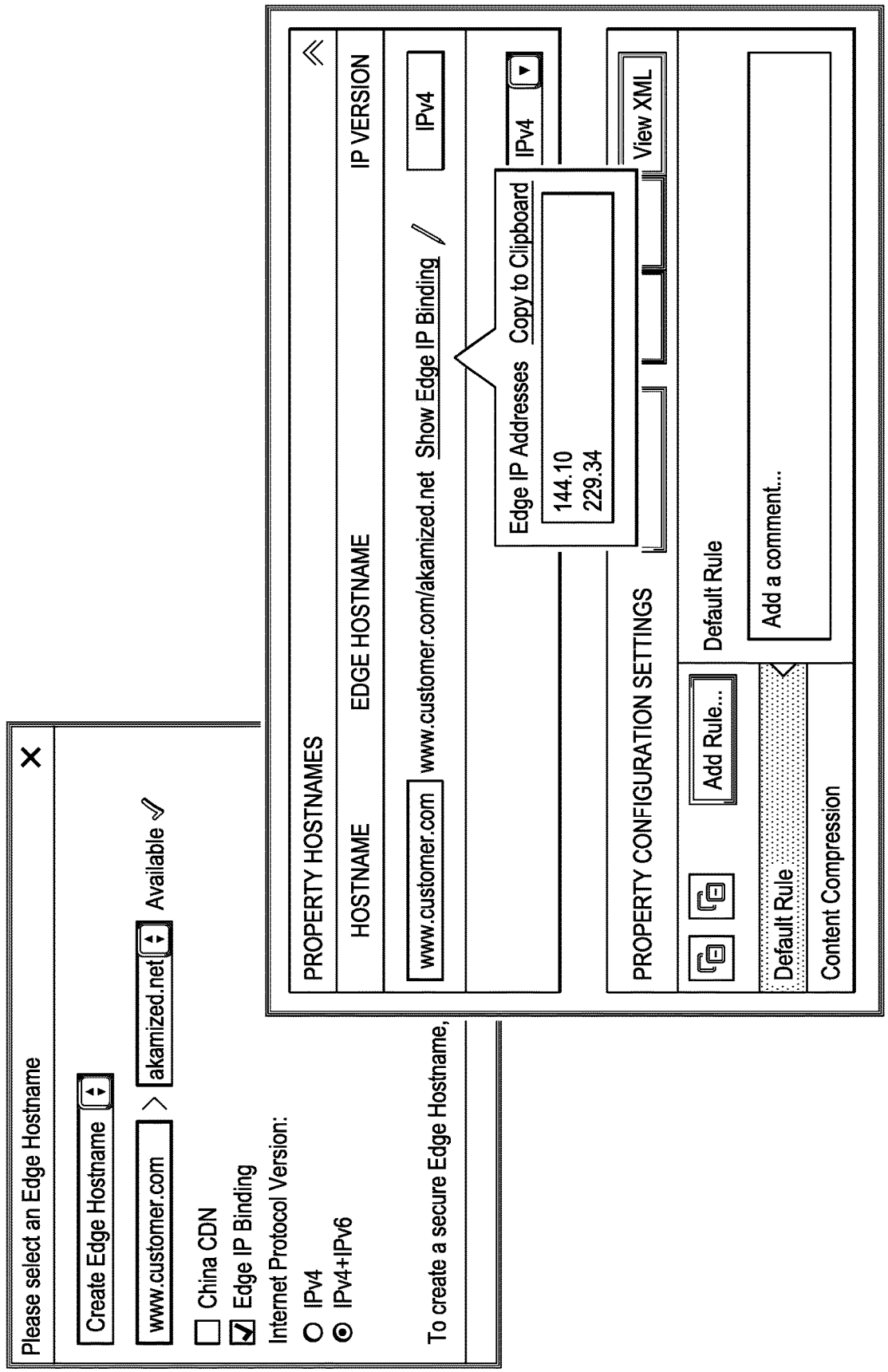
FIG. 4 illustrates a web-based configuration portal interface for use in configuring a ORB digital property to use the service.

FIG. 4 depicts a representative web-based configuration interface for the portal and by which the customer provisions the configuration. When a customer provisions a digital property for Zero Rated Billing, the portal preferably allocates a set of VIPs from pre-defined anycast pools. The customer may also select what overlay network (regular Web-based, or secure (SSL)-based) will serve the traffic for the property.

Figure 5:
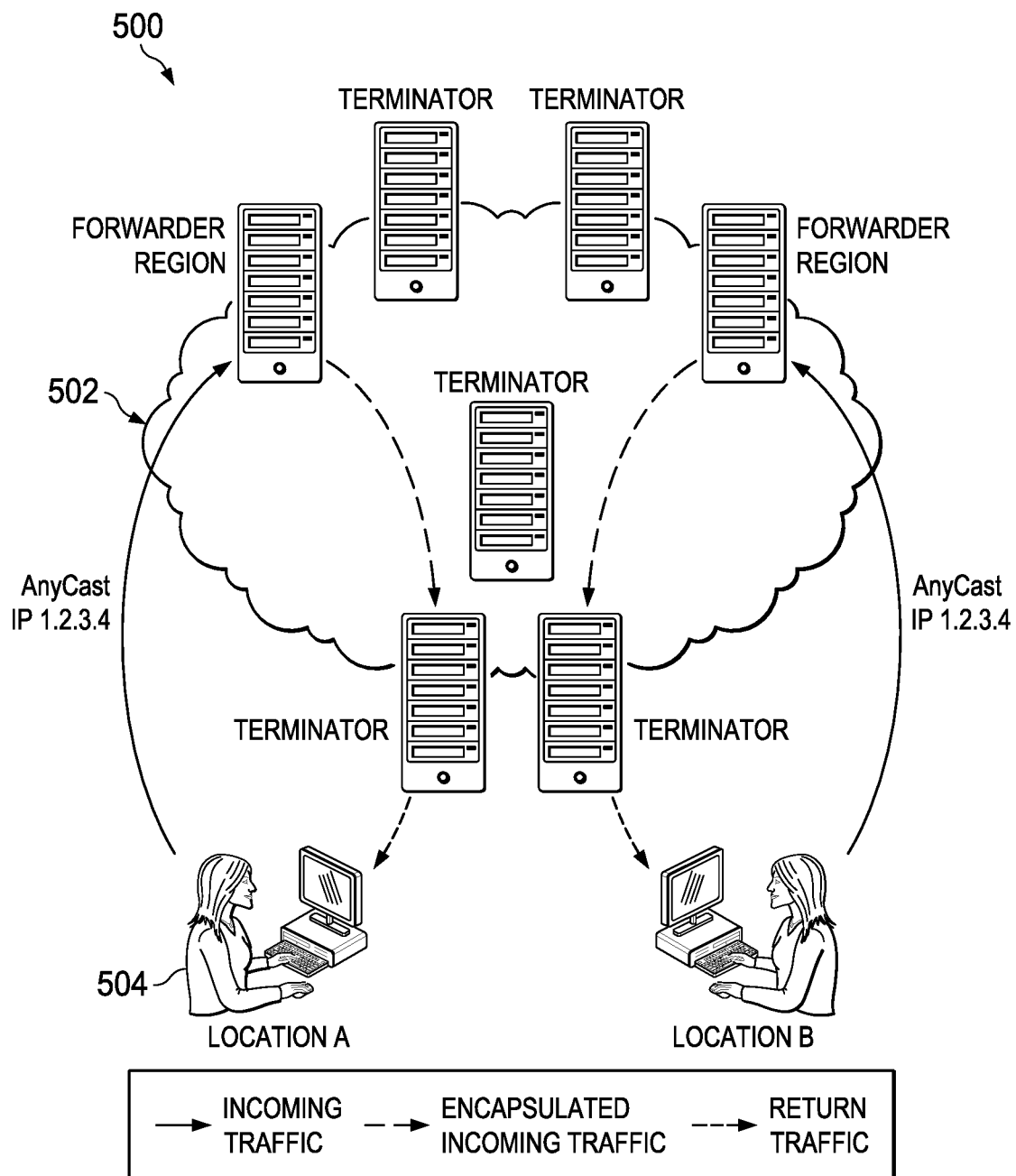
FIG. 5 illustrates the triangular routing technique of this disclosure.

As described above, and as illustrated in FIG. 5, when an end-user looks up the zero-rated property, either the customer's application or the customer's DNS will CNAME to a special edge host name, and the end user will receive one or more of the anycast VIPs in return (e.g., 1.2.3.4). The user's traffic is then directed to a nearby anycast forwarding region 500 via anycast. When a new connection arrives at that forwarding region, an Akamai edge IP address is then determined, preferably via lookup (once again to the DNS mapping system) of an end-user mapping DNS request. A rule is created and enforced that causes that connection to be persistently forwarded (and encapsulated) to one of the IPs returned by the CDN mapping system. At the destination machine (the terminator ghost 502), the traffic is de-capsulated, served as usual, and the reply traffic is sent directly to the end-user 504. This "triangular" routing is depicted in the figure.

Figure 6:
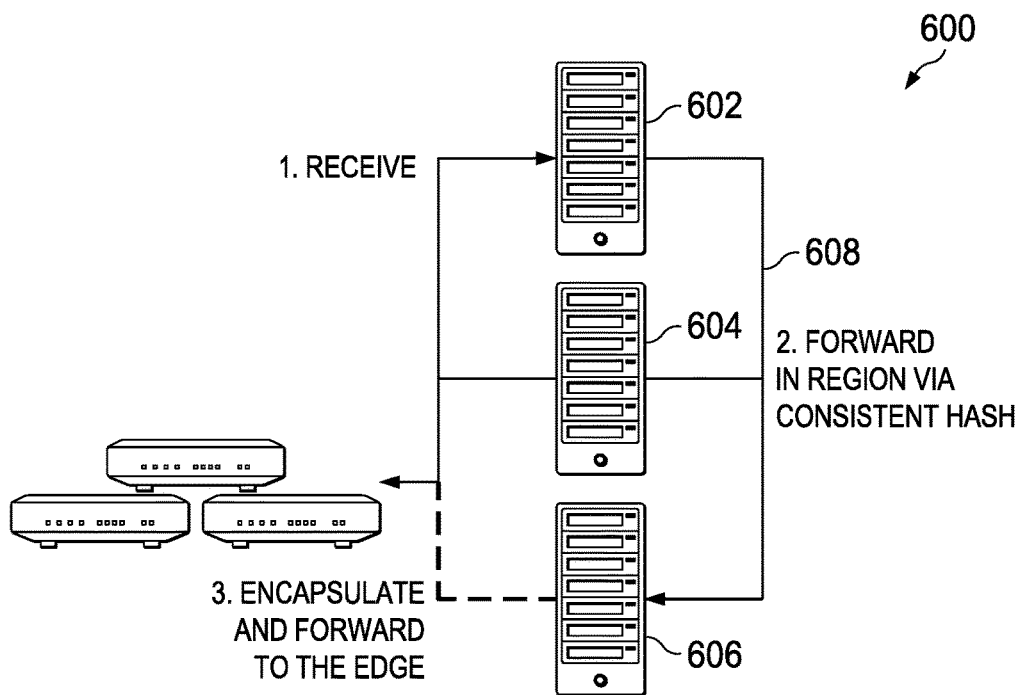
FIG. 6 illustrates a configuration of a forwarding region.

FIG. 6 illustrates the forwarder functionality in additional detail. In this example, the forwarder region 600 comprises a set of forwarder machines 602, 604 and 606 connected via a back-end network 608. A forwarder machine supports a routing component that is referred to as ARCd (anycast routing controller daemon). The daemon may be built into an operating system kernel, or execute as a standalone functionality. Preferably, the daemon creates and manages an in-kernel lookup table of connections. These connection records are referred to as "IP LLCs." The kernel supports a special type of anycast binding that includes the following information: IPv4 or IPv6 mask/value identifying anycast VIPs to which it applies, TCP ports to which the binding applies, in-region forwarding policy, destination HostIDs (for in-region consistent hash forwarding), and "default" destination IP addresses for forwarding in the event of ARCd failure. The forwarding to the edge takes place via IP LLCs. Every packet arriving in an anycast forwarding region is then forwarded twice. In particular, ARCd forwards incoming packets matching an anycast binding to another in-region machine, preferably using the binding's host ID list via a consistent hash of the connection information. Second, the packets are forwarded to the edge per IP LLCs, supplied by the ARCd component. On the destination (ghost) machine, and when an IP LLC for this connection exists, ARCd encapsulates the packet and forwards it to the IP LLC address. Otherwise, it passes the packet to user space for processing.

According to this disclosure, the Anycast Routing Controller Daemon (ARCd) performs end-user mapping (EUM) for new end-user connections, keeps track of the end-user connections, and configures the kernel with the information it needs to perform its packet forwarding function. In particular, ARCd issues end-user mapping requests for the hostname specified in index file generated by the portal, as described above. The mapping system (the CDN authoritative DNS) replies with an address of a ghost that will serve this connection. To facilitate the EUM, ARCd's DNS requests preferably implement the ENDS0 client-subnet parameter to improve performance due to better caching and to reduce name server load. Given that the destination IP of a connection must not change, ARCd shares connection information with other possible forwarders over the back-end interface 608. To perform EUM, a modified version of BINDS named server is run, modified to include an EDNS0 client-subnet patch. When it needs to perform end-user mapping, ARCd request this information from a local name server look-up process, which either will return a cached answer, or act as a recursive resolver to obtain the answer.

To ensure maximum ISP compatibility and to satisfy the need to occasionally include additional information with forwarded packets, preferably ARCd encapsulates end-users' packets on their way from anycast forwarding regions to the edge regions. Encapsulation may be done in various ways, such as Linux kernel tunneling drivers, UDP encapsulation, or the like. On the terminator edge machine, routing tunnel code (which may be kernel-based) recognizes traffic (e.g., to the special UDP port if that approach is used) as being encapsulated anycast traffic. The code validates and decapsulate packets. The TCP processing code in the edge machine notifies the forwarder machines when a forwarded packet causes the edge to close its TCP connection. This notification will reduce the time connection state is kept by the forwarding regions, thereby enhancing resiliency against attack.

The anycast triangle routing solution of this disclosure provides significant advantages, and the solution may be generalized to provide a means to achieve end user mapping. In particular, and unlike traditional anycast CDNs (which proxy a connection to somewhere local in a data center), the technique herein provides a scalable way to proxy a connection to a deployment that is appropriate for the client itself (in that network/data center or somewhere else entirely). This allows the provider to map based on location of the client (rather than location of the recursive name server in front of the client), which spreads load while achieving good performance. Thus, the technique combines anycast and client-location based mapping, which could be done in a general sense (including, for 0-rated billing) to achieve scalable, high performing, end user-based mapping for end users that are behind centralized recursive resolvers. While the approach can be used as a general solution, the provider may use it to target particular networks where it is known (or discoverable) that clients are not well-represented by their recursive name servers. In these cases, the provider may know or discover that a widely-diverse population sits behind a single recursive resolver; normal DNS based mapping would map that name server (and all the clients behind it) to a single location. With the triangle anycast solution described herein, the provider (through the forwarder) hands out an anycast address, and then is able to map/triangle-route the clients from there. This gives the service provider an opportunity to map different clients individually so that the provider can give them mappings specific to their locations, spreading them out and giving them each best performance, rather than mapping them all together. Unlike regular end user mapping, which requires the recursive resolver to support ECS (EDNS0-Client-Subnet extension), this operation can be used without any coordination by the network, and across all types of content as the service provider sees fit.

Thus, according to this approach, packets are received on anycast addresses and then forwarded to edge servers internally preferably based on the source IP of the packets; the edge servers then reply directly to the end users. The packets are received on anycast and forwarded to the edge based on this source IP.

In one embodiment, the approach is used to deliver traffic, such as zero-rated billing (0RB) traffic, from fixed IP addresses in a scalable manner. A particular customer is assigned an anycast IP address for their 0RB traffic, which then automatically routes requests to one or many "nearest" locations to the actual edge network regions that will handle the traffic. Direct server return is used by the edge server in responding to a requesting client, but return traffic is from the anycast IP address, enabling zero rating (e.g., by carriers).

In another embodiment, the approach is used to support delivery of SSL traffic with vanity hostnames. With anycast, each customer can be assigned a single anycast address.

There may be a single anycast IP address per customer property, provided there is a way to share active connection state asking nearby forwarding regions. Typically, however, there are a set of addresses per customer property, although this is not a limitation.

As noted, the forwarding machines receiving the ingress traffic are located in anycast regions, and they operate high-performance IP packet forwarding software (the ARCd). These machines forward anycast traffic to edge network (or secure edge network) machines that service the requests and reply directly to end-users. Preferably, and to improve BGP routing and stability, multiple anycast prefixes (IPv4/24s and IPv6/48s) are setup, and these prefixes are assigned to anycast clouds, preferably associated with global transit ISPs. Each anycast cloud may contain multiple anycast prefixes, provided they do not overlap with other clouds prefixes. Regions that are located in respective transit ISPs belong only to that ISP's cloud and, thus, only announce CIDR blocks belonging to that cloud. Because preferably each anycast cloud is tied to a particular transit network, the clouds have different geographic coverage. Preferably, a CDN customer using this service is assign an IP address from each anycast cloud. According to another aspect, each anycast cloud is configured to announce two similar sets of CIDR blocks, referred to herein as "Entrances." Each Entrance preferably has the same number of IPs, and each customer preferably has an IP address in each entrance. In the usual case, each region in an anycast cloud announces addresses belonging to both of that cloud's entrances. At any given time, however, the mapping system hands out IPs belonging to only one of the Entrances (the "active" entrance), for the reasons as now explained.

By way of background, it should be appreciated that any change in BGP announcements can cause traffic to move to other anycast regions in the middle of a connection. Such move would most likely break the existing TCP connection, and the client would be required to reconnect, which is undesirable. In particular, when a large number of a region's machines are suspended, anycast routes for this region must be withdrawn, breaking all existing connections to the region. Likewise, when a large number of the region's machines are un-suspended, anycast routes for the region must be announced, and doing so will move routes from other regions to this region for some end users, again breaking their existing connections. The Entrances technique herein address this problem.

In particular, it is assumed that the CDN (e.g., via its Network Operations Command Center) has the ability to control which entrance is active. As noted above, for each anycast cloud, exactly one entrance is active (i.e., its IPs are handed out by the mapping system) at any given time. Assume Entrance A is currently active; when regions are suspended, the NOCC would then make changes to the announcements in Entrance B to reflect the desired post-suspension view. That is, the region being suspended will withdraw Entrance B CIDRs. BGP will then be allowed the time to converge based on the updated announcements (typically, a few minutes). Once BGP (for Entrance B) has converged, the CDN will transition to exclusively handing out Entrance B by the mapping system. In this state, existing connections in this suspended region will remain uninterrupted on Entrance A, while all new connections will be using the newly active Entrance B and, therefore, will not use this region. The CDN then waits for all traffic to drain away from Entrance A as the transactions complete and the TTLs expire (normal suspension interval). Once this is complete, the CDN is no longer using this region and maintenance may begin. Once the maintenance is allowed to begin, Entrance A BGP announcements for this region should be withdrawn.

Figure 7:
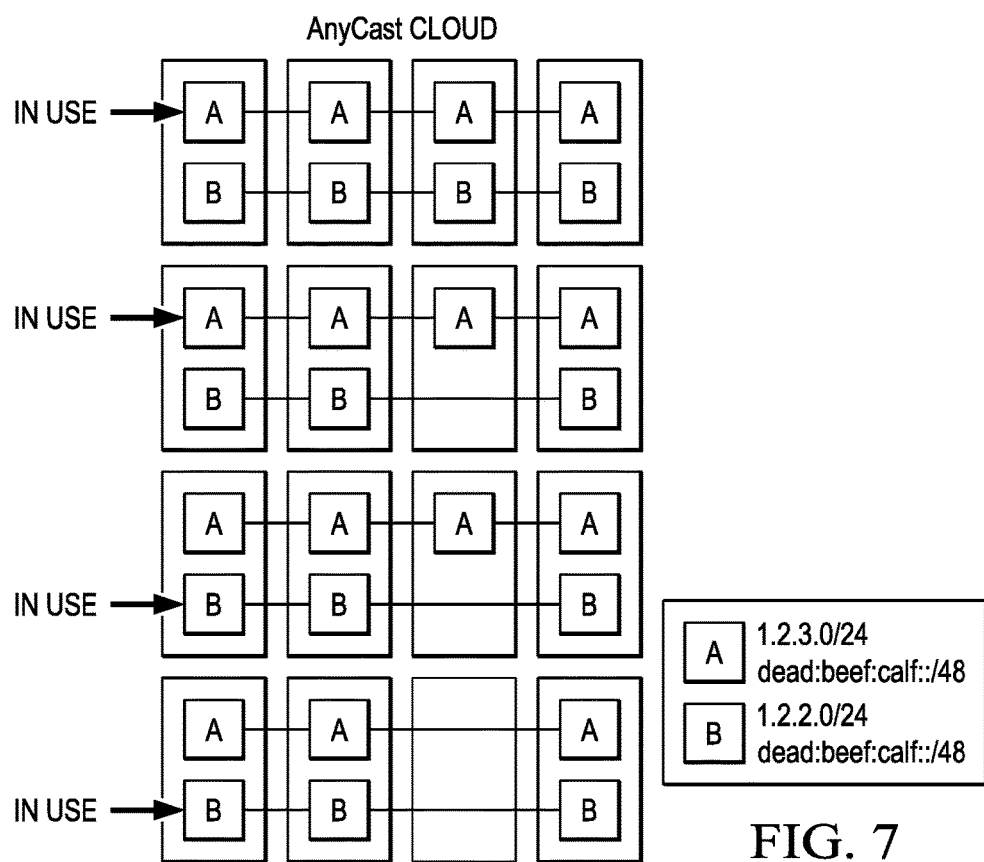
FIG. 7 illustrates how anycast cloud Entrances may be used to facilitate region suspension and un-suspension.

Region suspension operation is illustrated in FIG. 7.

Once the maintenance is complete and the region has been un-suspended, a similar transition back to the other Entrance should occur to re-introduce the region into its anycast cloud. If the active Entrance is B at the time when NOCC would like to restore the Region, the NOCC would need to do the following. First, the NOCC causes the region to be announced via Entrance A. After a BGP convergence delay (e.g., a few minutes), the NOCC makes Entrance A be the active Entrance. Traffic will drain from Entrance B over to Entrance A, and it will be gradually reintroduced to the region that is now present in Entrance A's announcements. After a usual suspension delay, as all traffic has been drained from Entrance B in this cloud, the region should start announcing Entrance B CIDRs as well.

The anycast cloud Entrance-based region suspension and un-suspension process, however, may move an entire load from the suspended region to another region in the anycast cloud. The other region in the anycast cloud could be significantly farther away from the end users. Thus, to improve load balancing after a region suspension, the system may employ anycast cloud geo-suppression in addition to the Entrance suspension. Anycast cloud geo-suppression is suspension of an anycast cloud over a limited set of geographies that would be mapped to the region by BGP. To suspend a region, anycast cloud geo-suspension may control the mapping mechanism to stop returning IP addresses of the region's anycast cloud to end users who could be directed to that region by BGP; instead, the mapping mechanism would return IP addresses belonging to other clouds. When paired with the Entrance suspension described above, the mapping mechanism has flexibility to send only some users to other clouds while letting the rest move to other regions in their current cloud.

More generally, anycast clouds may be load balanced, e.g., by collecting real-time information about geolocation-to-anycast region associations as well as performance for each cloud, and then using that information to load-balance traffic from each geo-location.

Preferably, the same edge machine that receives the connection should continue to receive additional connection requests from the requesting client. That said, according to another aspect of this disclosure, a forwarding machine operates to provide "stateless" IPv6 anycast forwarding. By not requiring "state" to be kept on the forwarding server (even though connection information may be shared by forwarding servers that operate on a common back-end), any forwarder, including forwarders in different locations, can continue to forward to the correct edge server (i.e., the one handling the initial request). With stateless forwarding, the system does not need to worry about BGP stability and can add a large number of anycast forwarder regions to improve capacity and performance. The provider can also control traffic better, e.g., by prepending or withdrawing region BGP announcements at will. To make forwarding stateless, the mapping system will resolve AAAA requests by encoding region # and IPv4 address of the edge service address in the lower bits of the reply.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

The techniques herein may be used irrespective of the traffic type.

The traffic may be TCP.

There is no limitation on the type of computing entity that may implement the client-side or server-side of the connection. Any computing entity (system, machine, device, program, process, utility, or the like) may act as the client or the server.

Finally, while given components of the system have been described separately, one of ordinary skill will appreciate that some of the functions may be combined or shared in given instructions, program sequences, code portions, and the like.

The techniques herein provide for improvements to a technology or technical field, namely, overlay networking, as well as improvements to the functioning of an acceleration server itself, namely, by extending its conventional functionality as has been described.

Having described our invention, what is claimed is set forth as follows:

1. Apparatus associated with an anycast Internet Protocol (IP) address and positioned in an overlay network to ingest requests for zero-rated billing (ORB) traffic, comprising:
   a processor;
   computer memory associated with the processor, the computer memory holding program code executed by the processor and configured to facilitate a triangle-based routing operation among a client, the apparatus, and a server of the overlay network, thereby enabling zero-rated handling of the traffic, the triangle-based routing operation returning a response directly to the client that bypasses the apparatus, wherein the program code is configured to perform the following ordered operations:
      responsive to receipt from the client of a packet associated with a request, the packet being received on the anycast IP address, issue a mapping request to mapping mechanism external to the apparatus, the mapping request having associated therewith an IP address, or a range of IP addresses, associated with the client from which the request originates;
      responsive to the mapping request issued to the mapping mechanism, receive from the mapping mechanism at least one IP address associated with a set of one or more of server machines, the IP address of the set of one or more of the server machines being determined by the mapping mechanism based at least in part on the IP address, or the range of IP addresses, associated with the client, server machine liveness and load, and Internet traffic conditions, and wherein the at least one IP address of the set of one or more of the server machines is associated with a deployment of server machines in the overlay network distinct from a location of the apparatus;
      responsive to receipt of the at least one IP address from the mapping mechanism, and without maintaining state, encapsulate the packet; and
      forward the encapsulated packet associated with the request to a server machine of the set of one or more of the server machines for handling by the server machine.

2. The apparatus method as described in claim 1 wherein the anycast IP address is associated with an ORB IP address.

3. The apparatus as described in claim 1 wherein the program code is further configured to share connection information with one or more other co-located apparatuses.

4. The apparatus as described in claim 1 wherein the program code is configured to advertise the anycast IP address over Border Gateway Protocol (BGP).

5. The apparatus as described in claim 1 wherein the program code is further configured to receive configuration regarding a digital property.

6. The apparatus as described in claim 1 wherein the packet is a Transmission Control Protocol (TCP) packet.

7. The apparatus as described in claim 1 wherein the IP address associated with the client obtained using an Extension Mechanisms for DNS (EDNSO) client Classless Inter-Domain Routing (CIDR) extension.

8. The apparatus as described in claim 1 wherein the anycast IP address is associated with an anycast cloud, the anycast cloud being one of a set of anycast clouds.

9. The apparatus as described in claim 1 wherein the program code is further configured to receive from a server machine of the set of one or more of the server machines a notification of a loss of a persistent and encapsulated connection to the server machine.

* * * * *